Patented Sept. 19, 1922.

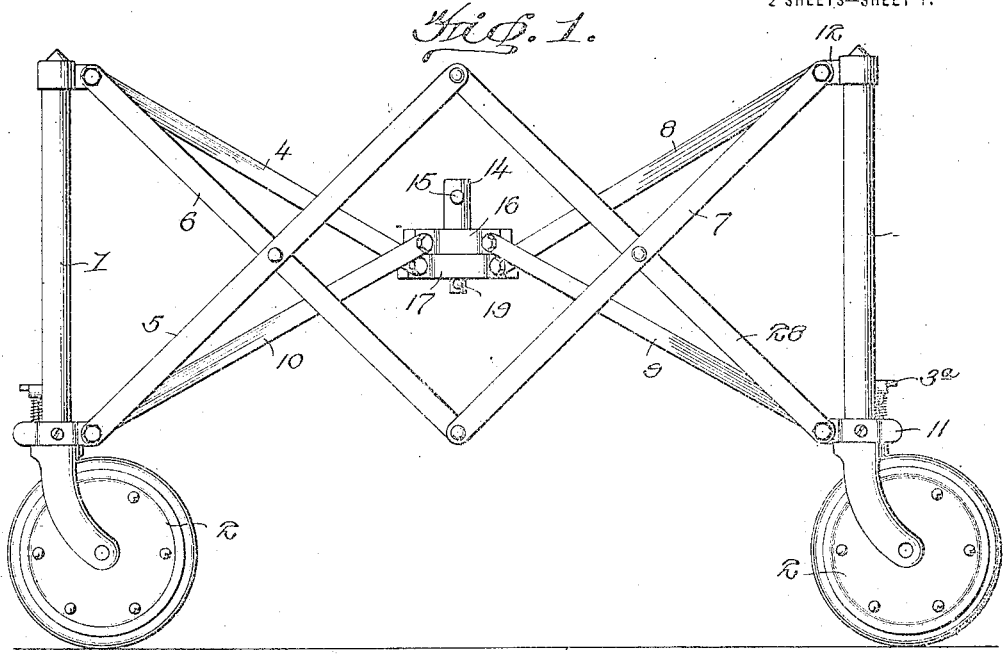

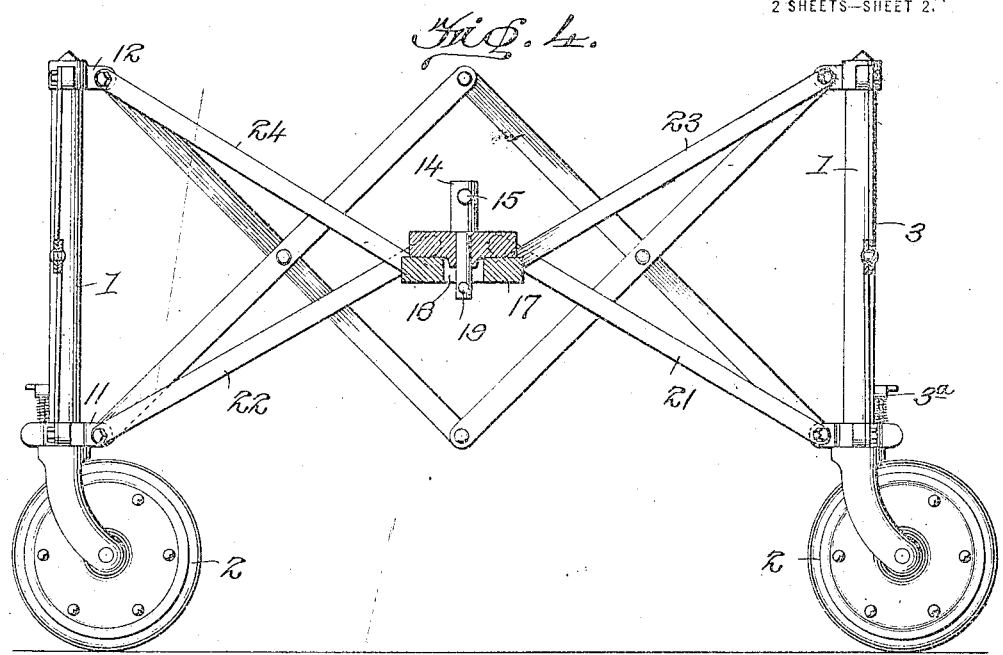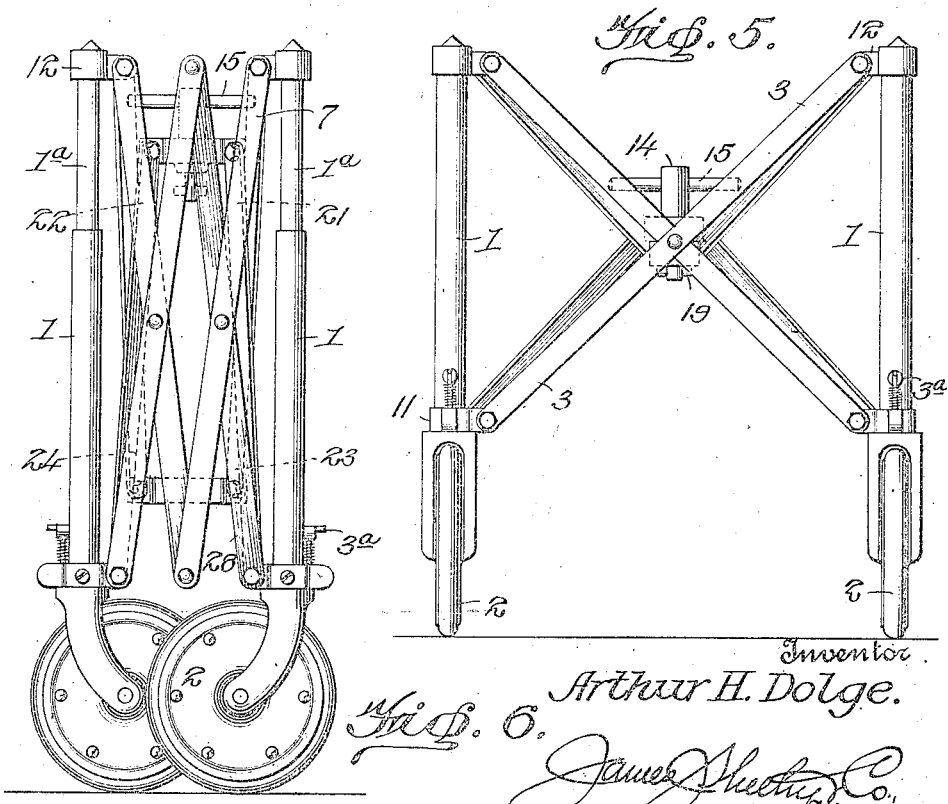

1,429,849

UNITED STATES PATENT OFFICE.

ARTHUR H. DOLGE, OF WESTPORT, CONNECTICUT.

LOCK FOR CHURCH TRUCKS.

Application filed September 29, 1921. Serial No. 504,067.

*To all whom it may concern:*

Be it known that I, ARTHUR H. DOLGE, a citizen of the United States, residing at Westport, in the county of Fairfield and State of Connecticut, have invented new and useful Improvements in Locks for Church Trucks, of which the following is a specification.

My present invention pertains to casket trucks such for instance as are employed by undertakers, embalmers and the like, and it comtemplates the provision of a casket truck that is readily and easily folded into a small and compact device and may be as readily and easily extended into its working position, and when said truck is so extended the same will be convieniently locked and retained in such extended position without the liability of collapse of the truck notwithstanding the weight of the load imposed thereon.

The invention further contemplates the provision of a church truck lock that is simple in construction and quickly and easily manipulated and that may be locked or unlocked by a person using but a slight amount of effort.

The locking element of my church truck moreover is of such construction that the folding and opening of the truck is a very simple matter, and what might be termed "automatic".

Other objects and characteristic features of the invention may be fully understood from the following description and claims, when the same are read in connection with the drawings, accompanying and forming part of my invention, in which:

Figure 1 is a perspective view showing my novel truck in its extended or operative position.

Figure 2 is a top plan view of the truck in its extended or operative position.

Figure 3 is a detailed view of the lock I employ to retain the truck in a rigid manner when extended.

Figure 4 is a sectional view through the lock and showing a portion of the truck in side elevation.

Figure 5 is a front elevation of the truck.

Figure 6 is a front elevation of the truck in its folded position.

Similar numerals of reference designate corresponding parts in all of the views of the drawings.

The posts of the truck are provided with the outer hollow casings 1, into which the members 1ᵃ telescope, and the said posts are provided with the side brace members 5, 6, 7 and 28 that are well known in the art and are secured to the posts as illustrated.

The truck is further provided with the front and rear brace rods 3 that are also well known in the art and therefore a detailed description of these brace rods as well as the brace rods or members and posts is deemed unnecessary.

The posts moreover are provided with the hangers to which wheels 2 are secured in any approved manner and I also provide locking means 3ᵃ to prevent turning of the wheels when deemed necessary and the locking means as well as the wheels forming no part of my improvement are not specified in detail.

However, I would distinctly have it understood that any form of wheels and locks therefor may be employed in the discretion of those practicing the invention without effecting the novel features and claimed elements of my invention.

Secured about the upper end of the posts are collars 12, and secured about the lower ends of said posts are collars 11, and the said collars 11 and 12 are adapted to receive brace rods as shown.

These brace rods are secured to the locking element of my invention and as will be readily appreciated by reference to the drawings, comprise a rod 10 that is secured to one of the lower collars 11 and is also secured at its opposite end to the uppermost element 16 of the locking member. The rod 9 is similarly arranged with respect to its complementary post as shown in Figure 1, and like the rod 10 is secured at one end to the collar 11 of the post and at its opposite end to the upper element 16 of the locking member directly opposite the end of the rod 4 and works in a similar manner to said rod 10.

It will here be noted that the rod 10 is secured at the opposite side of the collar 11 to that on which the rod 5 is secured and that the rod 9 is secured to the collar 11 on the opposite side to that on which the rod 28 is secured. However, rods 5 and 28 are secured to each other while the rods 9 and 10 are secured to the locking element as above set forth.

On the posts complementary to the posts to which the rods 9 and 10 are secured, I arrange and secure rods 21 and 22 that are similarly secured to their complementary collars 11 as are the rods 9 and 10 and are likewise secured to the upper element 16 of the lock. However, the rods 21 and 9 are opposite to each other whereas rods 10 and 22 are arranged on opposite side faces of the element 16.

As shown clearly in Figure 1 the rod 4 extends from the collar 11 at the upper end of the post to which it is secured opposite the rod 6 and at its lower end the rod 4 is secured to the lower element 17 of the lock and a similarly attached rod 8 is secured to the opposite post of the truck and is also secured to the element 17 as indicated. These rods are secured to the outer face of the element 17 directly opposite each other.

Rods 23 and 24 are similarly secured to their complementary posts but on the inner face of the lower element 17; the rod 24 corresponding to rod 4 and the rod 23 corresponding to rod 8.

At this point I would have it understood that the elements 16 and 17 comprise the body portion of my novel lock, that the element 16 is provided with the stem 14 having a handle 15 whereby the stem is adapted to turn independently of the element 16 and at its lower end the stem that is reduced in diameter is provided with a locking key or member 19 that is fast thereto.

The element 17 of my novel lock is provided with the key or locking element opening 18, and said opening is adapted to receive the key and lower stem of the portion 14 when the elements are forced to the position where they abut upon each other.

The construction of the locking element and its relation to the posts and rods 4, 9, 10, 8, 21, 22, 23 and 24, is such that the liability of the truck collapsing when fully extended is positively precluded and this for the reason that the said posts are firmly and rigidly braced at their tops as well as their bottom, and this construction it will be apparent assures the strong and rigid retention of the various elements in their proper position with respect to each other.

In the practical use of the truck, the operator merely places the truck as shown in its collapsed position at any desired point, and then by merely pushing downwardly on the handle 15, the elements 16 and 17 of the locking device are forced against and abut with respect to each other, to the position shown in Figures 1 and 4, respectively. Then by merely turning the handle until the portion 19 is cross-way of the lower element 17, the elements are securely locked with respect to each other, and collapse of the truck is precluded.

It will be manifest that the truck is extended to its working position by means of the top and bottom braces running to each post from the center locking elements, so that when the truck is fully extended the truck may be turned over on its side and it will not close. Moreover, notwithstanding the fact that the finished truck weighs but thirty-five pounds, it is capable of supporting the weight of one thousand pounds, without fear of collapse.

The novel and unique construction of the truck gives its elements great rigidity and strength for the purpose of conveying a heavy casket, and when the truck is locked the center locking elements together with the brace rods tends to produce a solid unit.

It will be manifest that the truck is simple and comparatively inexpensive to produce and combined in a truck a rigid construction that is simple and quickly, quietly and conveniently extended and folded when demand requires.

Having described my invention, what I claim and desire to secure by Letters-Patent, is:

1. In a lock for church trucks, the combination of an upper element, a lower element upon which the upper element is adapted to bear at certain times, an opening arranged in the lower element, a standard secured in and adapted to turn independently with respect to the upper element, and brace rods secured to the upper and lower elements and also secured to the posts of the truck.

2. In a church truck the combination of a lock having an upper portion, a locking member secured thereto, a lower member adapted to receive the upper member at certain times and having an aperture to receive the locking member of the upper portion whereby the several portions both upper and lower are retained in rigid manner with respect to each other, brace rods secured to the upper and lower portions, and adapted to be secured at their opposite ends to the posts of a church truck.

3. In a church truck, the combination of a series of posts, secured to each other by lazy-tong rods, a lock comprising an upper and lower section and means for securing the lock sections to each other in rigid manner when desired, rods secured to the lower section of the lock and the upper end of the posts, and other rods secured to the upper section of the lock and the lower end of the posts.

In testimony whereof I have hereunto set my hand in presence of two subscribing witnesses.

ARTHUR H. DOLGE.

Witnesses:
ROSE E. HERTZ,
CHAS. F. HENDRICKS.